July 13, 1954     E. T. DALTON     2,683,342
LENS BLOCKING DEVICE

Filed Oct. 11, 1951     2 Sheets-Sheet 1

INVENTOR
ERNEST T. DALTON
BY
Louis L. Gagnon
ATTORNEY

July 13, 1954     E. T. DALTON     2,683,342

LENS BLOCKING DEVICE

Filed Oct. 11, 1951     2 Sheets-Sheet 2

INVENTOR.
ERNEST T. DALTON
BY
ATTORNEY

Patented July 13, 1954

2,683,342

UNITED STATES PATENT OFFICE 2,683,342

LENS BLOCKING DEVICE

Ernest T. Dalton, Southbridge, Mass., assignor to American Optical Company, Southbridge, Mass., a voluntary association of Massachusetts Application October 11, 1951, Serial No. 250,851

9 Claims. (Cl. 51—277)

1

This invention relates to lens blocking devices and has particular reference to means and method of supporting a plurality of lens blanks whereby subsequent surfacing operations may be simultaneously and accurately performed thereon.

Prior art devices teach methods of blocking a plurality of lens blanks for simultaneous surfacing by affixing the lens blanks to the rim of a wheel or similar type of holder by the use of pitch or other suitable cementitious material. However, it has been difficult to accurately position the lens blanks properly with respect to the center of the wheel or to the center of the curvatures of the surfaces to be formed thereon, which procedure must be accurately performed since during the subsequent grinding or polishing of the exposed surfaces of the lens blanks the wheel or holder having the lens blanks secured thereto is rotated about its axis and the lens blanks simultaneously engaged by a tool of controlled shape whereby the lens blanks will be provided with surfaces of the desired shape.

Therefore, it is a primary object of this invention to provide improved means and method for efficiently and accurately blocking a plurality of lens blanks whereby they may be supported in predetermined relative positions for subsequent simultaneous surfacing operations.

Another object is the provision of a device for supporting a plurality of lens blanks in desired prelocated positions and retaining them in said positions through suction introduced by a continuous drawing of air in a direction inwardly of the seats for said lens blanks.

Another object is to provide a device of the above character having means for individually adjusting the lens blanks to desired positions with respect to the center of the holder being used for supporting the lens blanks during subsequent surfacing operations.

Another object is the provision of a device of the above character wherein the lens blanks are located in encircling relation with the rim of a wheel or similar holder to which they are to be secured, said device having means for inserting a cementitious material between the holder and lens blanks whereby when the holder is subsequently removed from the device the blanks will be securely fixed in the same relation thereto as they were when prelocated in the device prior to the insertion of the cementitious material.

Another object is to provide a device of the above character which is relatively simple in construction, efficient in operation and economical to manufacture.

2

Other objects and advantages of the invention will become apparent from the following description taken in connection with the accompanying drawing in which.

Figure 1:
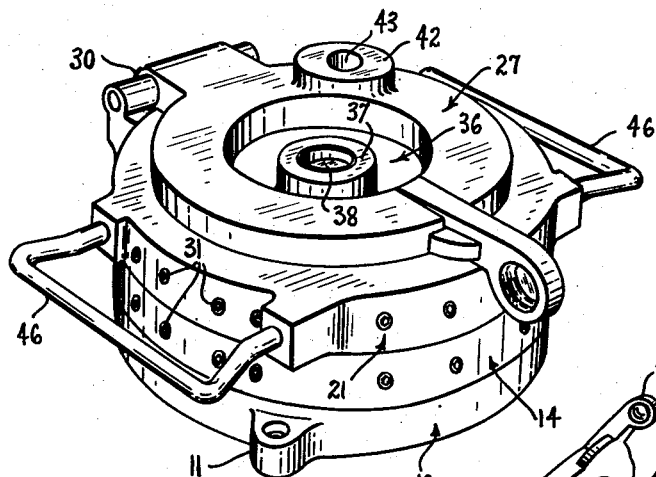
Fig. 1 is a front perspective view of the mold constituting a preferred embodiment of the invention.

Referring more particularly to the drawing wherein like characters of reference designate like parts throughout the several views, it is first pointed out that the lens blanks to be blocked are preferably formed by molding or other means to a standard uniform size, shape and thickness. The device embodying the invention comprises a substantially circular base plate 10 having tapped lugs 11 formed integral therewith at spaced intervals along its periphery through which bolts 12 or similar connecting means can be inserted for attaching the device to a table 13 or other supporting means therefor. A lower mold half 14 is formed to a substantial ring-like shape and is adapted to be positioned upon the base plate 10. The base plate 10 is provided with an annular recessed area 15 in its upper surface adjacent its outer peripheral edge upon which the lower mold half 14 rests and is also provided with a second annular recessed area 16 adjoining the inner periphery of the recessed area 15 forming a shoulder which is engaged by the inner surface of the lower annular portion 18 of the lower mold half 14 which rests upon the outer annular recessed area 15. The inner wall 18 of the lower mold half 14 is provided with a plurality of half cavities 17 shaped substantially to the contour size and shape of the lower half of the lens blanks and spaced substantially equidistant apart throughout the surface 18.

The upper mold half 21 is shaped similarly to the lower mold half 14 and is adapted to be positioned thereupon, the lower mold half 14 fixedly carrying spaced pins 22 which are adapted to be inserted within openings 23 in the upper mold half 21 for retaining the mold halves 14 and 21 in desired assembled relation. The upper mold half 21 is provided with a plurality of half cavities 24 which are of the same shape and dimensional characteristics as the cavities 17 in the lower mold half 14 and which correlate therewith whereby when the mold halves are in assembled relation the adjoining pairs of half cavities will each form a single cavity of the complete contour shape and size of the lens blank to be blocked. The inner wall 25 of the upper mold half 21 is shaped similar to the shape of the inner wall 18 of the lower mold half 14 and is adapted to be positioned against the shoulder formed by an annular recess 26 in the lower surface of a cover 27. Opposed annular recesses 16 and 28 are formed respectively in the base plate 10 and cover 27 inwardly of the recesses 15 and 26 so that when the device is assembled grooves 20 and 29 (Fig. 4) are provided adjacent each cavity 17 and 24. The cover 27 is hinged as at 30 to the upper mold half 21.

Figure 2:
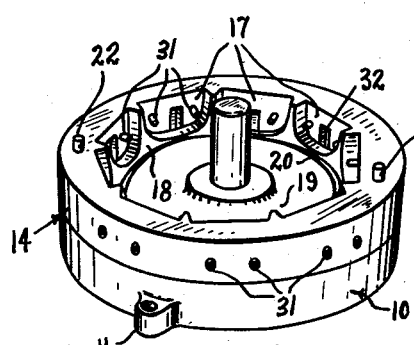
Fig. 2 is a perspective view of the lower portion of the mold formed in accordance with the invention.

Each of the cavities 24 and 17 of the respective upper and lower mold halves 21 and 14 have the ends of adjusting pins 31 projecting therein (Figs. 2, 3 and 4), the pins being threadedly mounted through the material of the mold halves 21 and 14 from the outer peripheral surfaces and being of a predetermined controlled length whereby lenses 35 positioned against the pins 31 will be spaced slightly from the inner walls of the cavities.

Figure 6:
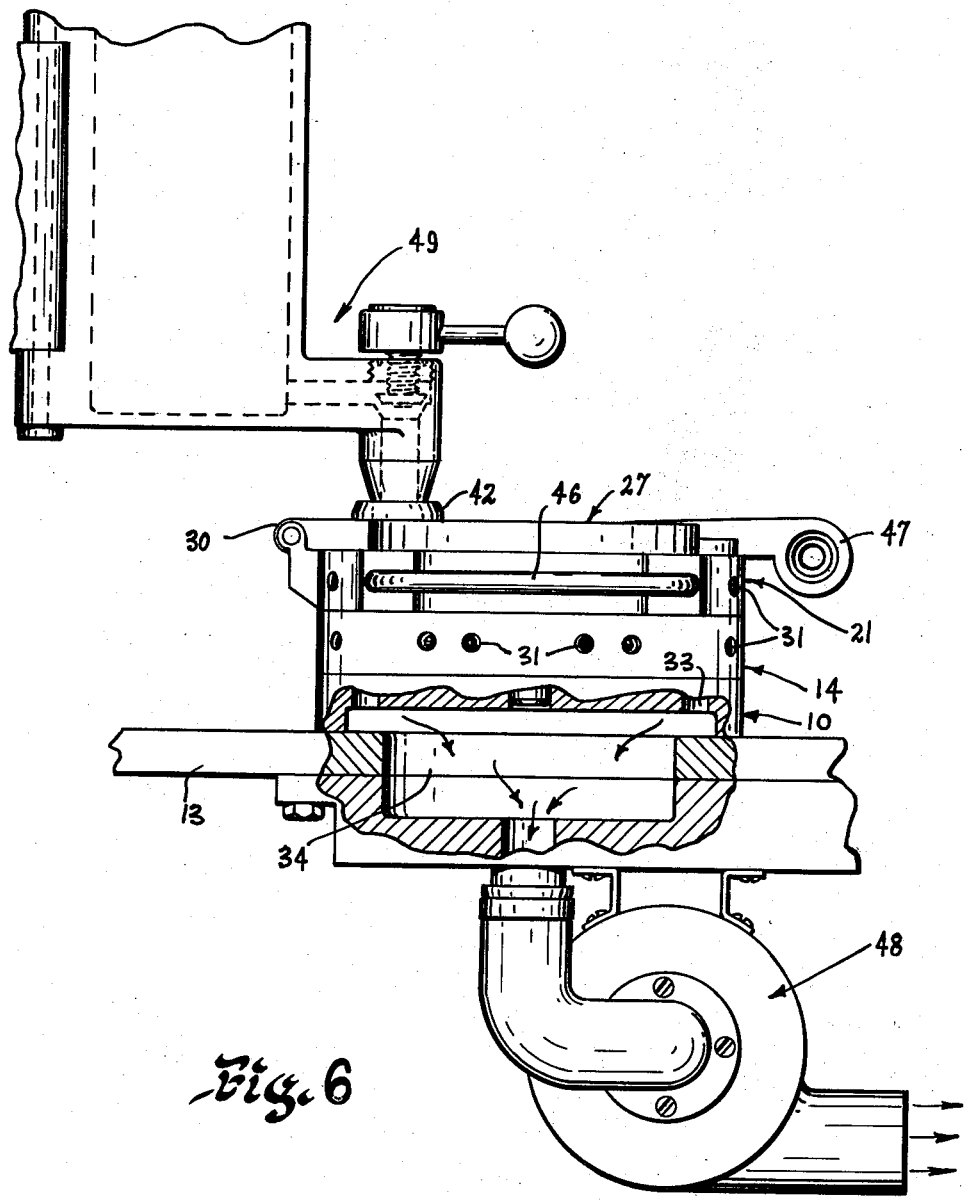
Fig. 6 is a view partly in section showing the air evacuating means and cementitious material dispenser in combination with the mold.

Means is provided in the device for permitting circulation of air from the cavities 24—17 through the base plate 10 and comprises an opening 32 formed in the rear wall of each of the cavities 17 and communicating with vertical openings 33 provided in the base plate 10, which openings 33 in turn communicate with an enlarged opening 24 in the table 13. Thus air may be drawn from the cavities 17 as indicated by the arrows in Fig. 4 through the respective openings 32, 33 and 34 by any suitable means such as a fan 48 (Fig. 6).

Figure 4:
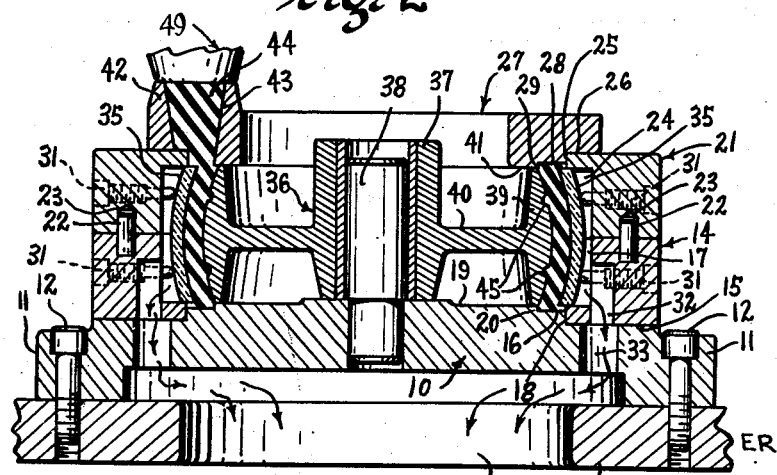
Fig. 4 is a sectional view through the mold.

In using the device a lens blank 35 is inserted in each of the half cavities 24 and 17 with its convex surface which is to be subsequently ground or polished being positioned against the ends of the pins 31 and its lower edge resting on the bottom wall of the half cavity 17 as shown in Fig. 4. The pins 31 are preferably so adjusted that the peripheral edges of the lens blanks 35 will extend slightly beyond the inner surfaces of the portions 18 and 28 of the respective mold halves 14 and 21 (Fig. 4). The lens blanks will be held against the pins 31 by a partial vacuum created by the sucking action of air described above. After locating the lens blanks in the cavities a holder 36 is inserted within the mold halves, the holder 36 preferably being in the form of a wheel having a hub portion 37 which is adapted to be mounted over a centrally disposed locating pin 38 carried by the base plate 10 and having an annular rim portion 39 which is attached to the hub by means such as spokes 40. The holder 36 is, of course, inserted upon the locating pin 38 when the cover 27 is in raised position, after which the cover is lowered into closed relation with the upper mold half 21 whereupon the inner annular surface area 41 of the cover 27 lying immediately inwardly of the annular recess 28 will rest upon the upper edge of the rim 39, the lower edge of the rim 39 being positioned upon the surface 19 of the base plate 10. Thus the holder 36 is securely retained in desired position in the device with the lens blanks 35 located in spaced encircling relation therewith, the lens blanks 35 all being located at a predetermined controlled distance from the center of the holder 36. It is particularly pointed out that due to the fact that the holder 36 has a relatively intimate fit with the pin 38 and is adapted to seat relatively intimately with the surface 19, and that the cavity 17—24 is axially aligned with the horizontal center line of the rim of the holder 36 whereby the lens blanks 35, when positioned in said cavities and in engagement with the pins therein, will automatically be aligned with the holder in this meridian, it being understood of course that the pins are properly adjusted to bring about this result as well as to position the lens blanks in proper relation with the center of rotation of the holder during the actual abrading.

Figure 5:
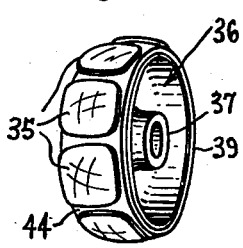
Fig. 5 is a perspective view of a holder having lens blanks secured thereto.

The cover 27 is provided with a boss 42 formed on its upper surface, the boss 42 having a bore 43 therethrough which communicates with the space between the lens blanks 35 and the adjacent surface of the rim 39 of the holder 36. Through this opening 43 a cementitious material 44 such as pitch or other suitable adhesive can be inserted by means of dispenser 49. The pitch 44 is preferably forced through the opening in thick liquid form whereupon it will flow around the rim 39 of the holder 36. The outer surface of the rim 39 is provided with a plurality of small notches, grooves or similar recesses 45 whereby the pitch will more securely adhere to the holder 36. The pitch 44 will also flow into the grooves 20 and 29 and thus will enclose entirely the exposed portions of the edges of the lens blanks 35. This will aid in more securely retaining the blanks on the holder. Upon subsequently allowing the pitch to set it will become hard. Then the cover 27 is raised and the upper mold half 21 is removed and the holder 36 then lifted off the locating pin 38. The lens blanks 35 will be secured to the holder 36 by the pitch 44 as shown in Fig. 5, the blanks each being retained on the holder in desired relation with respect to the center of the holder 36. Thus the holder 36 may be subsequently attached to a grinding or polishing machine and when rotated about its center the blanks, when engaged by a finishing tool, will be surfaced as desired.

Figure 3:
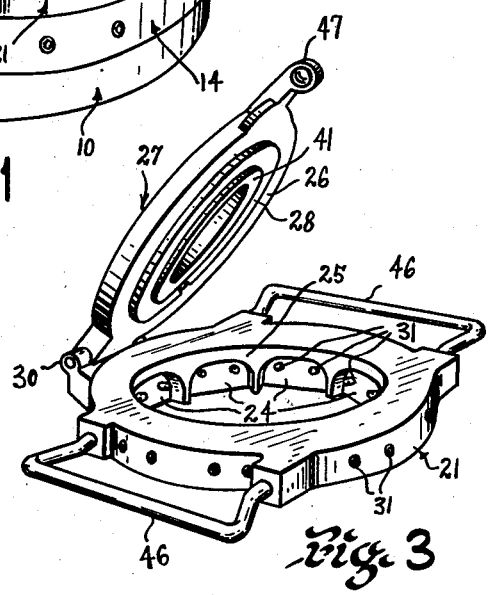
Fig. 3 is a perspective view of the upper portion of the mold showing the cover in raised position.

A pair of handles 46 may be secured to opposite sides of the upper mold half 21 whereby it may be easily removed from its assembled relation with the lower mold half 14, and a handle 47 may be provided on or attached to the cover 27 as shown in Figs. 1 and 3 for ease in raising and lowering the cover during use of the device.

From the foregoing it will be seen that efficient and economical means and method have been provided for accomplishing the invention in accordance with the objects set forth hereinbefore. It will be apparent, however, that many changes may be made in the details of construction and arrangement of parts as well as in the method shown and described without departing from the spirit of the invention as expressed in the accompanying claims. Therefore, it is to be understood that all matter set forth in the specification or shown in the accompanying drawing is to be interpreted as illustrative and not in a limiting sense.

I claim:

1. A lens blocking device comprising a frame having a circular opening therein, said frame being provided with a plurality of spaced lens-blank-receiving recesses in the inner wall of the opening and adjustable spacer means for engaging the rear surface of lens blanks when positioned in the recesses whereby the lens blanks may be retained in the respective recesses in predetermined spaced relation with the center of the opening, a holder removably positioned within said opening and having a rim portion thereof positioned in spaced relation with lens blanks when positioned in said recesses, and means for inserting a cementitious material in said openings between said rim portion of the holder and said lens blanks when so positioned whereby said blanks may be secured to said holder.

2. A lens blocking device comprising a frame having a circular opening therein, said frame being provided with a plurality of spaced lens-blank-receiving recesses in the inner wall of the opening, pin-like members protruding from the inner walls of said recesses for engagement with lens blanks when positioned in said recesses to locate the lens blanks in spaced relation with the inner walls of said recesses and in predetermined spaced relation with the center of said opening, said opening being of a size to permit a holder to be inserted within said opening and having a rim portion thereof positioned in spaced relation with said lens blanks when so positioned in said recesses, and means for inserting a cementitious material in said opening between said rim portion of the holder and said lens blanks when so positioned whereby said blanks may be secured to said holder.

3. A lens blocking device comprising a frame having a circular opening therein, said frame being provided with a plurality of spaced lens-blank-receiving recesses in the inner wall of the opening, pin-like members protruding from the inner walls of said recesses for engagement with lens blanks when positioned in said recesses to locate the lens blanks in spaced relation with the inner walls of said recesses and in predetermined spaced relation with the center of said opening, means for creating a partial vacuum in the space between said lens blanks and inner walls of said recesses when the lens blanks are so positioned for retaining said lens blanks within said recesses, said opening being of a size to permit a holder to be inserted within said opening with a rim portion thereof positioned in spaced relation with the lens blanks when positioned in said recesses, and means for inserting a cementitious material in said opening between said rim portion of the holder and said lens blanks when so positioned whereby said blanks may be secured to said holder.

4. A lens blocking device comprising a frame having a circular opening therein, said frame being provided with a plurality of spaced lens-blank-receiving recesses in the inner wall of the opening, pin-like members protruding from the inner walls of said recesses for engagement with lens blanks when positioned in said recesses to locate the lens blanks in spaced relation with the inner walls of said recesses and in predetermined spaced relation with the center of said opening, means for creating a partial vacuum in the space between said lens blanks and inner walls of said recesses when the lens blanks are so positioned for retaining said lens blanks within said recesses, said opening being of a size to permit a holder to be inserted within said opening with a rim portion thereof positioned in spaced relation with the lens blanks when positioned in said recesses, means carried by said frame for retaining said holder in predetermined position in said opening, and means for inserting a cementitious material in said opening between said rim portion of the holder and said lens blanks when so positioned whereby said blanks may be secured to said holder.

5. A lens blocking device comprising a base, a first frame on said base having a circular opening therein and having a plurality of substantially semi-circular shaped recesses in the inner wall of the opening adjacent its edge remote from said base, a second frame shaped to abut upon said first frame and having a circular opening therein similar to the opening in said first frame, said second frame having a plurality of substantially semi-circular shaped recesses in the inner wall of the opening therein adjacent its edge abutting said first frame, means for connecting said frames together whereby said recesses in the respective frames will be aligned to form a plurality of substantially circular shaped lens-blank-receiving cavities, said openings being of a size to permit a holder to be inserted within the openings in said frames with a rim portion thereof positioned in spaced relation with the lens blanks when positioned in said cavities, a cap carried by said second frame having a portion to overlie the space between the lens blanks and the rim portion of the holder when positioned within said device, and a port in said cap communicating with said space for inserting a cementitious material between said rim portion of the holder and said lens blanks when so positioned whereby said blanks may be secured to said holder.

6. A lens blocking device comprising a base, a first frame on said base having a circular opening therein and having a plurality of substantially semi-circular shaped recesses in the inner wall of the opening adjacent its edge remote from said base, a second frame shaped to abut upon said first frame and having a circular opening therein similar to the opening in said first frame, said second frame having a plurality of substantially semi-circular shaped recesses in the inner wall of the opening therein adjacent its edge abutting said first frame, means for connecting said frames together whereby the circular openings in the frames will be concentric and whereby said recesses in the respective frames will be aligned to form a plurality of substantially circular shaped lens-blank-receiving cavities, pin-like members protruding from the inner walls of said recesses for engagement with lens blanks when positioned in said cavities for spacing said lens blanks in spaced relation with said inner walls of the recesses and in predetermined spaced relation with the center of said concentric openings in the frames, said openings being of a size to permit a holder to be inserted within the openings in said frames with a rim portion thereof positioned in spaced relation with the lens blanks when positioned in said cavities, and means for inserting a cementitious material in said opening between said rim portion of the holder and said lens blanks when so positioned whereby said blanks may be secured to said holder.

7. A lens blocking device comprising a base, a first frame on said base having a circular opening therein and having a plurality of substantially semi-circular shaped recesses in the inner wall of the opening adjacent its edge remote from said base, a second frame shaped to abut upon said first frame and having a circular opening therein similar to the opening in said first frame, said second frame having a plurality of substantially semi-circular shaped recesses in the inner wall of the opeining therein adjacent its edge abutting said first frame, means for connecting said frames together whereby the circular openings in the frames will be concentric and whereby said recesses in the respective frames will be aligned to form a plurality of substantially circular shaped lens-blank-receiving cavities, pin-like members protruding from the inner walls of said recesses for engagement with lens blanks when positioned in said cavities for spacing said lens blanks in spaced relation with said inner walls of the recesses and in predetermined spaced relation with the center of said concentric openings in the frames, ports in said first frame communicating with said recesses to which air evacuating means may be connected for creating a partial vacuum in the space between the lens blanks and the inner walls of the recesses when the lens blanks are so positioned for retaining said lens blanks within said cavities, said openings being of a size to permit a holder to be inserted within the openings in said frames with a rim portion thereof positioned in spaced relation with said lens blanks when positioned in said cavities whereby cementitious material may be inserted in said opening between said rim portion of the holder and said lens blanks to secure the blanks to said holder.

8. A lens blocking device comprising a base, a first frame on said base having a circular opening therein and having a plurality of substantially semi-circular shaped recesses in the inner wall of the opening adjacent its edge remote from said base, a second frame shaped to abut upon said first frame and having a circular opening therein similar to the opening in said first frame, said second frame having a plurality of substantially semi-circular shaped recesses in the inner wall of the opening therein adjacent its edge abutting said first frame, means for connecting said frames together whereby the circular openings in the frames will be concentric and whereby said recesses in the respective frames will be aligned to form a plurality of substantially circular shaped lens-blank-receiving cavities, pin-like members protruding from the inner walls of said recesses for engagement with the lens blanks when positioned in said cavities for spacing said lens blanks in spaced relation with said inner walls of the recesses and in predetermined spaced relation with the center of said concentric openings in the frames, means for creating a partial vacuum in the space between the lens blanks and the inner walls of the recesses when the lens blanks are so positioned for retaining said lens blanks within said cavities, locating means carried by said base and adapted to extend into the circular opening in said first frame to engage a holder adapted to be inserted within the openings in said frames, said holder when so inserted having a rim portion thereof positioned in spaced relation with the lens blanks when positioned in said cavities, and means for inserting a cementitious material in said opening between said rim portion of the holder and said lens blanks when so positioned whereby said blanks may be secured to said holder.

9. A lens blocking device comprising a frame having a circular opening therein, said frame being provided with a plurality of spaced lens-blank-receiving recesses in the inner wall of the opening each shaped substantially to the contour size and shape of a lens blank and spacer means located within said recesses and protruding from a rear wall thereof for engaging the lens blanks when positioned therein whereby they may be retained in the respective recesses in predetermined spaced relation with the center of the opening, said opening being of a size to permit a holder to be inserted within said opening and having its rim portion positioned in spaced relation with the lens blanks when so retained in the recesses, whereby cementitious material may be inserted in the space between the lens blanks and rim portion of the holder and so be secured to the holder.

References Cited in the file of this patent

UNITED STATES PATENTS

| Number | Name | Date |
|---|---|---|
| 1,355,211 | Bugbee | Oct. 12, 1920 |
| 2,007,366 | Clement | July 9, 1935 |
| 2,509,211 | Clement | May 30, 1950 |